Dec. 14, 1948.    R. S. CARTER ET AL    2,456,580
METHOD OF MAKING TRANSMISSION BELTS
Filed Jan. 24, 1944    3 Sheets-Sheet 1
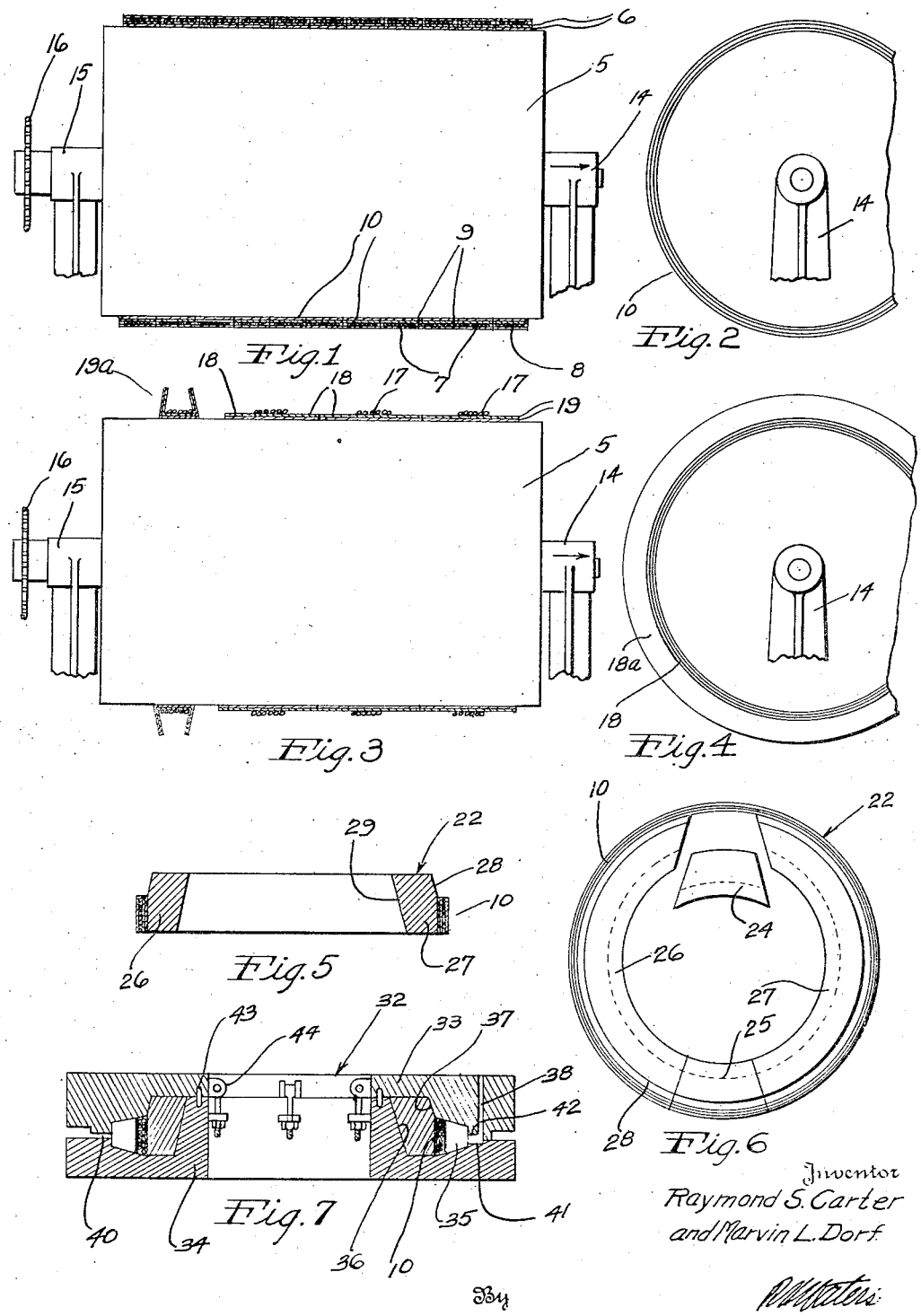
Inventor
Raymond S. Carter
and Marvin L. Dorf
Attorney

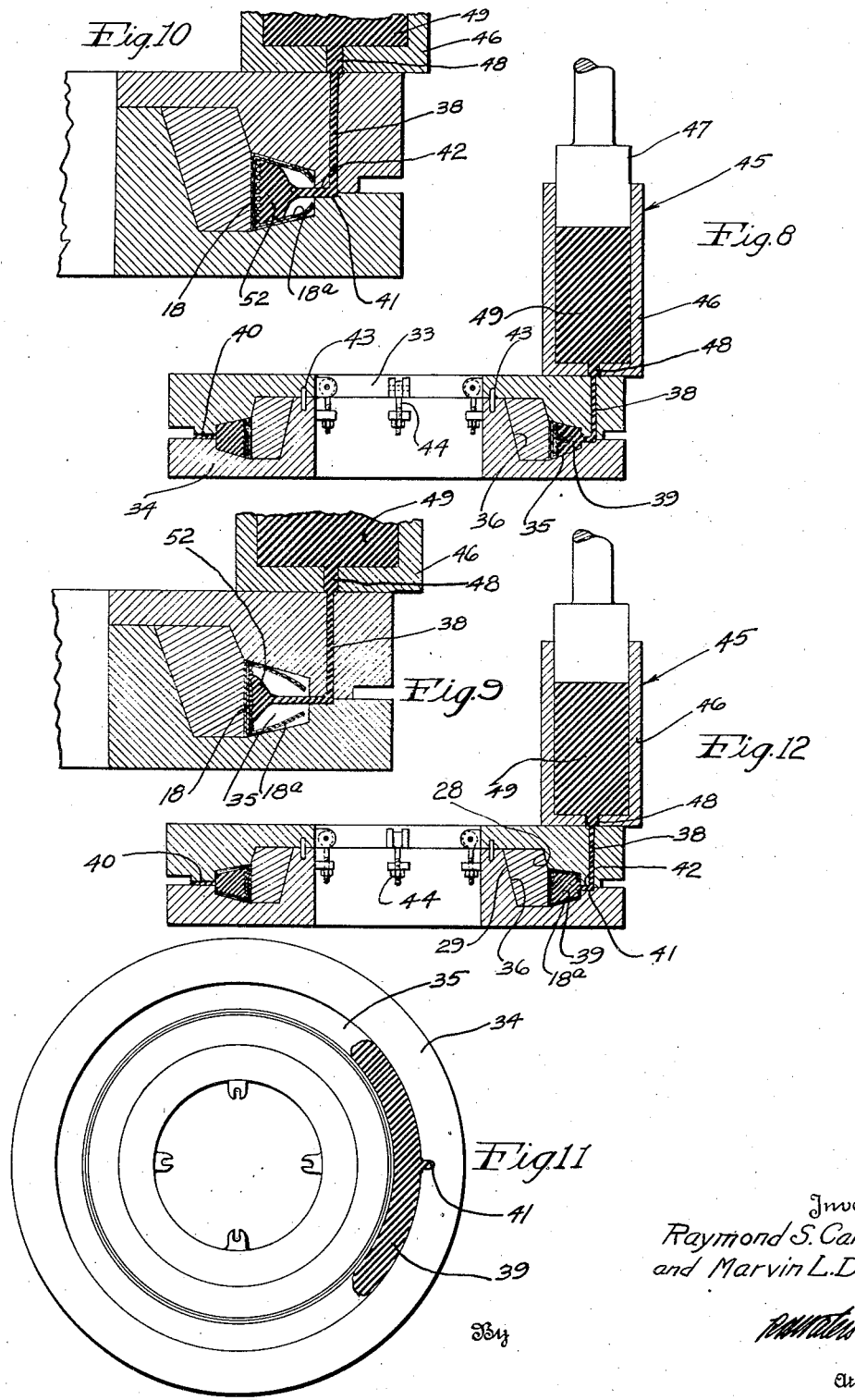

Dec. 14, 1948.    R. S. CARTER ET AL    2,456,580
METHOD OF MAKING TRANSMISSION BELTS
Filed Jan. 24, 1944    3 Sheets-Sheet 3
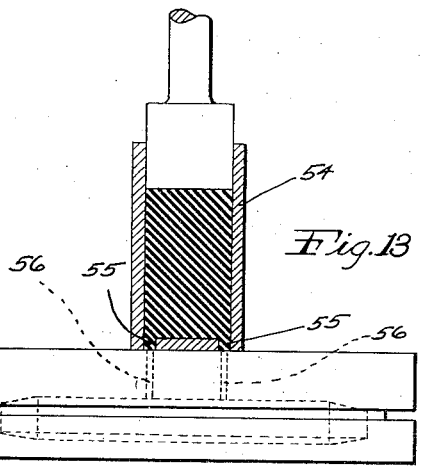
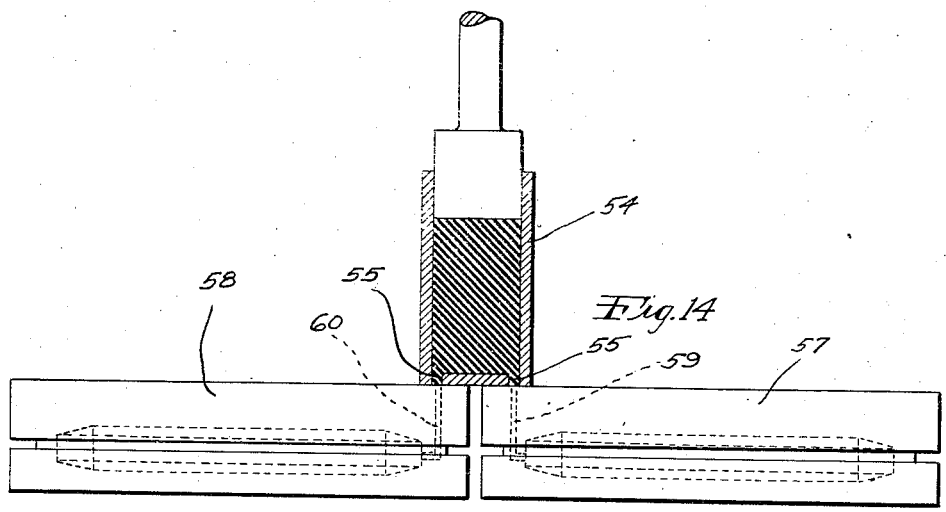
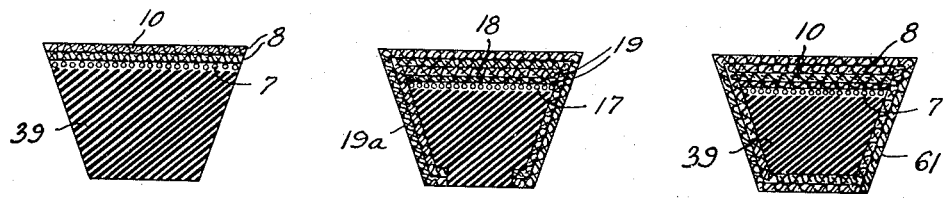
Inventors
Raymond S. Carter
and Marvin L. Dorf Patented Dec. 14, 1948

2,456,580

UNITED STATES PATENT OFFICE 2,456,580

METHOD OF MAKING TRANSMISSION BELTS

Raymond S. Carter, Cuyahoga Falls, and Marvin L. Dorf, Akron, Ohio, assignors to Wingfoot Corporation, Akron, Ohio, a corporation of Delaware Application January 24, 1944, Serial No. 519,448

11 Claims. (Cl. 18—59)

This invention relates to a method for producing power transmission belts of the endless type composed of fabric and rubber, and particularly to the type that have a substantial thickness as compared to their width.

For the purpose of illustrating and describing this invention, we choose a belt of trapezoidal cross-section generally referred to as a V-belt, but the invention is not limited thereto.

The method employed by this invention to form and vulcanize belts of this character is one in which belts are produced of uniform cross-section throughout their entire length, will be free from wobble or other irregular motion and will retain their initial or natural stresses while running over two or more pulleys.

Previous methods of making belts of this character have been to build the various elements up one on top of the other on a cylindrical drum, slit the plied up cylinder into endless bands covering said bands with one or more plies of fabric, placing in a mold and vulcanizing. Other methods may vary somewhat but they all lead to a common and frequent occasion for rejection; that is, lack of uniformity due to unavoidable variations such as fabric gauges, rubber stock gauges, inequalities set up in pulling on the cover and rolling same down, etc. Such inequalities are algebraically accumulative and, as a result of such methods, uniformity to a desired degree is impossible to control and results in a high percentage of rejections involving a high labor cost and waste of material. This is particularly true when wire is used as a reinforcement. Due to the unyielding nature of the wire a maximum of accuracy is required in assembling the various elements of the belt body, otherwise when the belt is placed in a mold for vulcanizing the wires tend to buckle causing such irregularities that many belts are rendered unfit for use. Belts made by previous methods are vulcanized in a circular mold and placed therein in the same position in which they are preliminarily formed, whereby all the elements are in neutral position. When belts made by these previous methods are placed over two or more pulleys, all elements of the belts are immediately put under stress. The bottom side of the belt in contact with the pulleys is in compression and the same portion extending between the pulleys is in tension. The top side of the belt over the pulleys will be in tension, and the top portion between the pulleys will be in compression. Thus, the top and bottom areas of the belt will be constantly flexing and alternating from tension to compression while running. This constant reversal of stresses generates fatigue and materially shortens the useful life of such belts.

An object of this invention is to provide belts of uniform cross-section that will run true, will eliminate buckling of the reinforcing member whether composed of fiber cords or steel wire, will eliminate wobble or vibration while running, reduce heat, and give longer and more efficient service than belts made by former methods.

These and other advantages are accomplished by forming the top side or tension portion of the belt in the form of a flat circular band which may be reinforced with either fiber cord or steel wire, placing the band over a sectional ring, the band contacting surface of which forms the inner wall of a mold cavity, and thereafter forming the bottom compression side of the belt by injecting the plastic stock under pressure into the remaining space of the mold, and vulcanizing the thus formed belt in an inside out position in the same mold in which it is formed. Thus, the mold serves a dual purpose of a means for forming and a means for vulcanizing belts of this type.

A belt formed and vulcanized in a circular mold cavity by this method results in the top and bottom sides of the belt being initially in neutral position while in a circular inside-out position, but when the belt is reversed to its normal operating position and held in a circular form, the bottom side of the belt will be in compression and the reinforced top side will be in tension. This is also true when a belt is placed over two or more pulleys; all portions of the bottom or cushion side will remain in compression, and all portions of the top side will remain in tension, and these stresses remain the same while the belt is in operation. Thus no change results in any portion from tension to compression or from compression to tension. While running, the bottom side of the belt between pulleys will be in residual compression with respect to the portion encircling the pulleys, and the top area in tension.

A belt formed and vulcanized wrong side out according to this invention will prolong its useful life. Such a belt, which is composed largely of rubber, will endure much more flexing while under constant compression than when periodically and rapidly alternating from compression to tension. Such changes from compression to tension generate heat which induces a destructive influence in a belt of the conventional type thereby causing separation of the various elements. A further advantage of a belt made in accordance with this invention is that the reinforcing cords or wires in the top side of the belt will be consolidated in the finished product in the same undistorted relation in which assembled thus insuring desired uniformity of unit stress in service throughout its length. These and other features and advantages will be apparent when considered in view of the following description and the accompanying drawings in which:

Fig. 1 is an elevation of a drum showing the reinforced element of the top side of the belt assembled thereon, illustrating a so-called rawedged type of belt;

Fig. 2 is an end view of Fig. 1;

Fig. 3 is the same as Fig. 1 except the outer covering for the belts is shown as extended from the reinforced top side of the belt; illustrating a type of belt wherein the sides are encased by a turn-up of the base cover;

Fig. 4 is an end view of Fig. 3;

Fig. 5 is a cross-sectional view of a segmental ring with a reinforced top portion of a belt in place thereon;

Fig. 6 is a plan view of Fig. 5 with one key segment removed;

Fig. 7 is a cross-sectional view of a mold with the segmental ring and top portion assembled therein;

Fig. 8 is a cross-sectional view showing a mold with all the elements assembled therein, including the injection feed device as having introduced the plastic body mass within the mold cavity;

Fig. 9 is a fragmentary cross-sectional view showing the plastic entering the mold cavity;

Fig. 10 is a fragmentary cross-sectional view showing the manner in which the plastic banks;

Fig. 11 is a plan view of the bottom half of a mold showing the cavity partly filled;

Fig. 12 is a cross-sectional view showing a mold with all the elements therein; the plastic body mass of the belt having been fully injected;

Fig. 13 is an elevation partly in section showing how the mold filling may be expedited by providing two filling orifices;

Fig. 14 is an elevation showing how two molds may be filled simultaneously by the same pressure unit;

Fig. 15 is a cross-sectional view of a belt void of side fabric;

Fig. 16 is a cross-sectional view of a belt having the sides and a portion of the bottom covered with fabric; and Fig. 17 is a cross-sectional view of a belt in which an outer envelope is applied after forming.

The top side or tension member of belts of this character is composed of one or more plies of rubberized fabric in combination with a longitudinally disposed strength reinforcing medium which may be either fiber cords or steel wire. The tension members are preferably built up on a cylindrical form 5 as illustrated in Figs. 1 and 2. In Fig. 1, two plies of fabric 6 are first applied to the cylindrical form or drum 5, after which reinforcing cord or wire 7 is wound upon the fabric plies 6 at predetermined intervals whereby the cords or wires are wound in close parallelism. After a predetermined number of revolutions, a space is skipped and the winding continued and so on all the way across the drum to form a plurality of such belt elements.

The windings are then preferably covered with one or more plies of rubberized fabric 8, the thus formed sleeve is then slit as at 9 into bands 10 which form the top side or tension portion of the belts, the width of the bands is determined by the size of the belt. The drum 5 is supported by the bearings 14 and 15 and is driven by a sprocket wheel 16. The bearing 14 is conventionally and removably mounted to permit the bands 10 to be removed endwise from the drum 5. The bands 18 illustrated in Fig. 3 are made in a similar manner as in Fig. 1, except that the distance between the reinforcing strength elements 17 is greater. This is to permit the rubberized fabric plies 19 to be turned up as shown at 19a at each side of the reinforcing elements to form a fabric covering for the sides and the whole or a portion of the bottom side of belts. This is desirable in certain types of belts.

After the reinforced tension bands 10 or 18 have been formed in the manner described, they are removed from the drum and placed on a segmental ring 22 as shown in Fig. 5. This ring is divided into four segments 24, 25, 26 and 27 which permits a desired control of the circumferential dimension in the step of mounting the reinforced fabric bands 10 or 18 thereon. In preparations for mounting a band on the ring the segments 24 and 25 are moved toward the center which permits the segments 26 and 27 to be moved toward one another, thus permitting the bands to be easily placed about them. The smaller key segments 24 and 25 are then forced into place, and, as an additional aid to expedite the mounting of the bands, a portion of the outer surface of the ring is tapered as at 28. A segmental ring of this nature is of special importance because a band may be placed upon it without injury whereas if a straight surfaced solid ring is used, the bands may be subjected to undue stress or rupture in forcing them in place. This is especially true when wire is used as a reinforcement. By using a ring of this type, it will be impossible for the wires or cords to buckle. The inner surface of the ring is also provided with a tapered surface 29 which expedites positioning the ring in a mold.

After a band is positioned on the segmental ring 22, the ring with band in place is positioned in a mold 32 which consists of upper and lower mating halves 33 and 34 as shown in Fig. 7. The mold 32 is provided with a cavity 35 in which belts are formed and vulcanized reversed with respect to their actual working position, the lower half being provided with a tapered surface 36 which coincides with the inner tapered surface 29 of the segmental ring 22. The upper half is also provided with a tapered surface 37 cooperating with the outer taper 28 of the ring 22. An orifice 38 extends from the mold cavity to the upper surface of the mold through which the unvulcanized rubber mass is injected to form the under or compression side of belts 39, see Fig. 8. Diametrically opposite the orifice 38 an overflow vent 40 is provided through which air may escape to enable the cavity to be completely and evenly filled so that belts will be uniform in density and cross-sectional area. It will be noted that the orifice 38 is partially formed in the lower half of the mold as at 40 so that the injected material will enter the cavity centrally. To insure registration of the portion 41 in the lower half of the mold with the corresponding portion 42 in the upper half, dowel pins 43 are employed. The two halves of the mold are locked together by conventional means 44.

After a mold is thus assembled with the segmental ring and reinforced band in place, the mold is placed in contact with an injection pressure unit 45 as shown in Fig. 8. The pressure unit is of conventional form and comprises a cylinder 46 in which operates a plunger 47 which may be operated by hydraulic pressure or other means. The bottom of the cylinder 46 is provided with an orifice 48 which registers with the orifice 36 in the mold and when pressure is applied to the plunger 47 the plastic unvulcanized rubber 49 will be forced into the unfilled portion of the mold cavity 35 to completely and evenly fill said cavity and form the bottom or compression side of belts 39. Completion of the filling is indicated when the plastic 49 extrudes through the overflow vent 40. The plastic material 49 passes through the orifice in the mold and into the mold cavity where it is forced both ways around the cavity as illustrated in Fig. 11.

The apparatus and procedure as described and illustrated in Fig. 8 is for the so-called raw edge belt or a belt having no outer covering of fabric on its sides or bottom.

The apparatus and procedure for a belt formed as illustrated in Fig. 9 is the same as that shown and described for Fig. 8 except that in Fig. 9 the belt is provided with portions of fabric extending from each side of the reinforced bands 18 and integral therewith. These extending portions are for the purpose of forming a fabric covering for the sides of belts. The reinforced band 18 with the extending portions 18a is placed in a mold cavity, the extending portions having sufficient stiffness to enable them to maintain a position adjacent the mold cavity side walls. The plastic material is injected with such force that the initial charge passes between the extending portions of fabric 18a and makes its first contact with the inner side of the mold cavity against the reinforced band 18 and begins to bank as indicated at 52 (Fig. 9). Said bank immediately begins to spread and progressively forces the extending portions of fabric 18a against the side portions of the mold cavity as shown in Fig. 10. The injection is continued until the plastic material extrudes through the vent 40 and the mold is completely filled and the bottom or compression side 39 of the belt is formed as shown in Fig. 12. When formation of the belt is completed in the molds, the injection pressure cylinder is removed, the molds are then subjected to heat and pressure in the conventional manner and the belt vulcanized therein. Thus it will be apparent that time and labor will be saved by using molds as a medium for both forming and vulcanizing belts in an inside-out position and that a better and more satisfactory belt will result.

In order to expedite the filling of molds, it will prove to be advantageous, as illustrated in Fig. 13, to provide a pressure cylinder 54 having two extrusion openings 55 which coincide with corresponding openings 56 in the mold. By injecting the plastic rubber in this manner, the mold will be filled more quickly by permitting the plastic to flow more freely in both directions around the mold cavity.

A method in which two molds may be filled simultaneously is illustrated in Fig. 14. This is accomplished by placing the pressure cylinder 54 over two molds 57 and 58 in such a manner that the extrusion openings 55 of the cylinder will register respectively with openings 59 and 60 of molds when said molds are placed close together and with the orifices 59 and 60 positioned adjacent one another.

Fig. 15 illustrates a belt formed and vulcanized in accordance with the foregoing description and is of the so-called raw edge type, having no fabric on the sides thereof. Fig. 16 illustrates a belt having fabric on the sides thereof and it will be noted that the fabric covers the sides and turns the corners and extends a short distance on the bottom side of the belt.

In Fig. 17 the belt is formed in a mold in the same manner as that illustrated in Fig. 15. The belt is then semi-vulcanized and in this condition removed from the mold. One or more plies of fabric 61 are then placed over the semi-vulcanized form, placed in a second mold of slightly enlarged proportions, which compensate for the added fabric plies, and subjected to a second vulcanization to complete the belt.

From the foregoing it will be apparent that belts made according to the method described will be superior in quality and appearance and will give longer service than belts made by previous methods. By forming the belts in the cavities in which they are vulcanized in an inside-out position, more uniform and evenly running belts will be produced and belts so processed will be free of the deteriorating effect of reversing internal stresses.

The felt and mold for making the same disclosed in the present application forms the subject matter of applicants' divisional application, Serial No. 59,442, filed November 12, 1948.

We claim:

1. The method of making power transmission belts comprising the following steps, forming endless bands said bands being composed of plies of rubberized fabric having reinforcements embedded centrally therein, said bands having non-reinforced side portions extending on either side of said reinforcements, shaping said band by turning up said side portions to form a ring having a substantially U-shaped cross-section, holding said ring under tension, injecting a vulcanizable plastic material into said ring to form in cooperation therewith a ring having a trapezoidal cross-section, and subjecting the thus formed ring to heat and pressure to vulcanize same into a unitary body.

2. The method of manufacturing a power transmission belt composed of a tension member and a compression member comprising the following steps, forming a circular tension member of plies of rubberized fabric and substantially inextensible reinforcing members, shaping said tension member to form a generally channel shaped cross-section, confining said tension member under tension, injecting vulcanizable material under pressure into said channel shaped tension member, subjecting the thus formed body to heat and pressure to vulcanize same into a unitary body.

3. The method of making belts which comprises the steps of forming an endless band of substantially inextensible elements superimposed upon the outer circumference of an endless cover element having the edges turned radially outward along the sides of said inextensible elements, expanding the cover into substantially close association with the inextensible elements and, while holding said elements tensioned to take up any slack therein, superimposing a body layer of vulcanizable material on the outer surface of said assembled cover and elements, and vulcanizing the belt thus formed while maintaining said elements under tension.

4. The method of making power transmission belts which comprises the steps of forming an endless band incorporating an endless substantially inextensible layer, on the outer surface of a cover, turning the edges of the cover outwardly to form a trough in which the endless band lies, filling the space within said trough with a vulcanizable material, and vulcanizing the belt while maintaining longitudinal tension in said layer independent of the forces set up by the vulcanizing of the belt.

5. The method of forming and vulcanizing power transmission belts comprising the following steps, forming a band of plies of rubberized fabric and substantially inextensible elements with the edges of the band extending laterally beyond the inextensible elements, turning up the projecting edges of the band to form said band into a trough, confining said band under tension, injecting a vulcanizable material into the trough to form a ring having a generally trapezoidal cross section, and subjecting the confined ring to heat and pressure to vulcanize same into a unitary body.

6. The method of molding a power transmission belt comprising the steps of forming an endless band including substantially inextensible elements and at least a layer of rubberized fabric, confining said band under tension in a mold prior to injecting plastic vulcanizable material into the mold, thereafter injecting plastic vulcanizable material under pressure into contact with said tensioned band to form a unitary body, and heating said belt thus formed to vulcanize it.

7. The method of molding a belt which comprises forming an endless band of substantially inextensible elements, superimposing a body layer of vulcanizable material thereon, heating said band and body layer to vulcanize and unite them while maintaining an outwardly directed force on the band independent of any force exerted on said band by the body layer to thus tension and align said elements, and reversing the belt thus formed after vulcanization.

8. The method of molding a belt which comprises forming an endless band comprising fabric with a superimposed layer of substantially inextensible elements, superimposing a body layer of vulcanizable material thereon, heating said band and body layer to vulcanize and unite them while maintaining an outwardly directed force on the band independent of any force exerted on said band by the body layer, to thus tension and align said elements, and reversing the belt thus formed after vulcanization.

9. The method of molding a belt which comprises the steps of forming an endless substantially inextensible band, placing a longitudinal tension in said band by expanding the band outward prior to forming the body layer thereon, and, while maintaining the band under tension to tension and align said elements, superimposing a body layer of vulcanizable material on the tensioned band and heating the belt thus formed to vulcanize said body layer and to unite said band and body layer.

10. The method of making belts which comprises the steps of forming an endless band of substantially inextensible elements superimposed upon the outer circumference of an endless cover element, expanding the cover into substantially close association with the inextensible elements prior to forming the body layer thereon and with sufficient force to tension said elements, and, while holding said elements tensioned to take up any slack therein, superimposing a body layer of vulcanizable material on the outer surface of said assembled cover and elements, and applying heat to vulcanize the body layer and to unite said elements and body layer while maintaining said elements under tension.

11. The method of forming and vulcanizing power transmission belts comprising the following steps, forming a band of plies of rubberized fabric and substantially inextensible elements with the edges of the band extending laterally beyond the inextensible elements, turning up the projecting edges of the band to form said band into a trough, confining said band, injecting a vulcanizable material into the trough to form the body layer, and subjecting the confined band and body layer to heat to vulcanize the body layer and unite the band and body layer.

RAYMOND S. CARTER.
MARVIN L. DORF.

REFERENCES CITED

The following references are of record in the file of this patent:

UNITED STATES PATENTS

| Number | Name | Date |
|---|---|---|
| 255,355 | Triplett | Mar. 21, 1882 |
| 1,589,913 | Wells | June 22, 1926 |
| 1,924,083 | Carter et al. | Aug. 22, 1933 |
| 1,969,067 | Freeman | Aug. 7, 1934 |
| 2,211,202 | Freedlander | Aug. 13, 1940 |
| 2,216,863 | Visman | Oct. 8, 1940 |
| 2,235,906 | Skoning | Mar. 25, 1941 |
| 2,292,290 | Robins | Aug. 4, 1942 |
| 2,337,985 | Freedlander | Dec. 28, 1943 |
| 2,362,659 | Miller | Nov. 14, 1944 |